Patented Jan. 22, 1952

2,583,508

UNITED STATES PATENT OFFICE 2,583,508

β,β,β-TRICHLORETHYLIDENE-ACETYL-THIOPHENES

Jean Druey, Riehen, and Paul Schmidt, Therwil, Switzerland, assignors to Ciba Pharmaceutical Products, Inc., Summit, N. J.

No Drawing. Application April 2, 1951, Serial No. 218,889. In Switzerland April 18, 1950

4 Claims. (Cl. 260—332.3)

The present invention is concerned with valuable β,β,β-trichlorethylidene-acetyl-thiophenes.

While a large number of compounds with bactericidal and fungicidal action are known, none can be said to be ideal, for each to some extent is toxic to tissue. The embodiment of new compounds with enhanced bactericidal and fungicidal activity and with reduced or, at least, without increased toxicity to tissue therefore represents a desideratum in the art.

A primary object of the present invention is the embodiment of new compounds of the character described. This is achieved by the β,β,β-trichlorethylidene - acetyl - thiophenes of the present invention. These thiophenes correspond to the formula

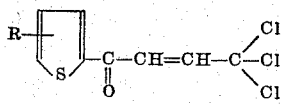

wherein R stands for hydrogen or a substituent. The latter is preferably a halogen atom, but may also be another substituent, such for example as an etherified or esterified hydroxy group, or a mercapto group, or an alkyl group.

These new compounds are characterized by their bacteriostatic and fungistatic activity; they are therefore useful as disinfecting agents and also therapeutically in the treatment of illnesses due to fungi. Particularly valuable in this regard is the 2-(β,β,β-trichlorethylidene-acetyl)-5-chloro-thiophene.

The aforedescribed thiophene compounds are obtained for example by reacting a 2-acetyl-thiophene with trichloracetaldehyde and splitting off water simultaneously or subsequently.

The reaction with trichloracetaldehyde is preferably carried out in a diluent which may also act as or may contain a condensing agent; preferably in the presence of glacial acetic acid and an acetate.

The invention is set forth in greater detail in the following examples of presently preferred illustrative embodiments thereof. Parts by weight bear the same relationship to parts by volume as does the gram to the cubic centimeter. The temperatures are given in degrees centigrade.

Example 1

22.4 parts of 2-acetyl-thiophene are heated for 30 hours to 100° with 25 parts by weight of anhydrous chloral and 3 parts by volume of glacial acetic acid. The excess chloral, the glacial acetic acid and the unreacted 2-acetyl-thiophene are then distilled off in vacuo. The solidified residue is recrystallized from petroleum ether, whereupon 2-trichlorohydroxyethyl-acetyl-thiophene, melting at 109°, is obtained.

1 part by weight of the thus-obtained 2-trichlorohydroxyethyl - acetyl - thiophene is intimately admixed with 20 parts by weight of phosphorus pentoxide, and the mixture is heated for 1 hour to 100° in a closed receptacle. Then, while cooling with the aid of a mixture of ice and salt, the reaction mixture is treated with 200 parts by weight of ice, and the separated black precipitate isolated by suction filtration. The precipitate is recrystallized from boiling petroleum ether in the form of yellowish crystals which melt at 63°. The product — 2-(β,β,β-trichlorethylidene-acetyl) -thiophene — corresponds to the formula

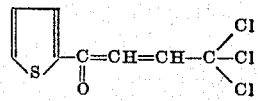

Example 2

8 parts by weight of 2-acetyl-5-bromo-thiophene are heated for 40 hours to 110° with 10 parts by weight of anhydrous chloral and 3 parts by volume of glacial acetic acid. The excess of chloral, the glacial acetic acid and the unreacted 2-acetyl-5-bromo-thiophene are then distilled off in vacuo, and the residue crystallized from boiling petroleum ether. The product is the 2 - trichloro - hydroxyethyl - acetyl - 5 - bromo - thiophene, which melts at 95°.

1 part of the thus-obtained 2-trichloro-hydroxyethyl-acetyl-5-bromo-thiophene is intimately mixed with 10 parts by weight of phosphorus pentoxide, and the mixture heated for 1½ hours to 100° in a closed receptacle. While cooling, the product is treated with 100 parts by weight of ice, whereupon the oil which separates out is extracted with a large quantity of ether. The ethereal extract is evaporated to dryness, and the residue recrystallized from boiling petroleum ether. The product, which is the 2-(β,β,β-trichlorethylidene-acetyl)-5-bromo-thiophene of the formula

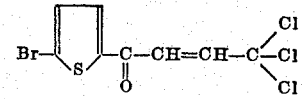

is obtained in the form of weakly yellow crystals which melt at 74°.

Example 3

10 parts by weight of 2-acetyl-5-chloro-thiophene are heated for 40 hours to 110° with 25 parts by weight of anhydrous chloral and 5 parts by volume of glacial acetic acid. The excess of chloral, the glacial acetic acid and the unreacted 2-acetyl-5-chloro-thiophene are then separated by vacuum distillation, and the oily residue is crystallized from petroleum ether. The product thus obtained melts at 85° and is the 2-trichloro-hydroxyethyl-acetyl-5-chloro-thiophene.

4 parts by weight of the thus-obtained 2-trichloro-hydroxyethyl-acetyl-5-chloro-thiophene are intimately admixed with 25 parts by weight of phosphorus pentoxide, and the mixture then heated to 100° for 1 hour in a closed receptacle. After cooling, 100 parts by weight of ice are added and then the precipitated oil is extracted with a large quantity of ether. The ethereal solution is evaporated to dryness and the residue recrystallized from petroleum ether to yield the 2-($\beta,\beta,\beta$-trichlorethylidene-acetyl)-5-chloro-thiophene of the formula

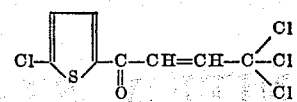

in the form of yellowish crystals which melt at 78°.

Having thus disclosed the invention, what is claimed is:

1. A 2-($\beta,\beta,\beta$-trichlorethylidene-acetyl)-thiophene.
2. 2-($\beta,\beta,\beta$-trichlorethylidene-acetyl)-thiophene.
3. 2-($\beta,\beta,\beta$-trichlorethylidine-acetyl)-5-chloro-thiophene.
4. 2-($\beta,\beta,\beta$-trichlorethylidene-acetyl)-5-bromo-thiophene.

JEAN DRUEY.
PAUL SCHMIDT.

No references cited.